United States Patent [19]  [11] Patent Number: 5,157,501
No et al.  [45] Date of Patent: Oct. 20, 1992

[54] BLOOMING MEASURING METHOD FOR SOLID STATE IMAGE PICK-UP DEVICE, AND APPARATUS SUITABLE FOR THE MEASURING

[75] Inventors: Young B. No; Dae K. Kim, both of Kyunggi-do, Rep. of Korea

[73] Assignee: SamSung Electronics Co., Ltd., Kyung Ki-Do, Rep. of Korea

[21] Appl. No.: 437,389

[22] Filed: Nov. 16, 1989

[30] Foreign Application Priority Data

Nov. 17, 1988 [KR] Rep. of Korea .................. 88-15134

[51] Int. Cl.⁵ ........................ H04N 3/14; H04N 5/335
[52] U.S. Cl. .......................... 358/213.19; 358/213.23
[58] Field of Search ................... 358/213.23, 213.19, 358/213.11, 10, 909, 228, 213.24; 357/24; 437/8; 324/121 R

[56] References Cited
U.S. PATENT DOCUMENTS 4,450,484  5/1984 Terakawa et al. ............. 358/213.19

Primary Examiner—James J. Groody
Assistant Examiner—Wendy R. Clements
Attorney, Agent, or Firm—Robert E. Bushnell

[57] ABSTRACT

A blooming measuring method for solid state image pick-up device and an apparatus thereof are disclosed, the method being constituted such that a spot beam having a certain area is irradiated to the light receiving zone of the solid state image pick-up device; the number of high level signal charges are counted from among the signal charges which are outputted from the solid state image pick-up device, and which are corresponding to one picture; and the counted value is compared with the area of the above mentioned spot beam. The apparatus of the present invention comprises: a light ray supplying means for supplying a spot beam; a driving signal generating means for driving the solid state image pick-up device; a signal detecting means for detecting only the signal charges; and a counting means for counting only the high level signals. According to the present invention, the variations of the characteristics can be excluded, and the measured results are outputted in a quantitative form, thereby making it possible to understand the characteristics exactly and precisely.

5 Claims, 4 Drawing Sheets

BLOOMING MEASURING METHOD FOR SOLID STATE IMAGE PICK-UP DEVICE, AND APPARATUS SUITABLE FOR THE MEASURING

FIELD OF THE INVENTION

The present invention relates to a blooming measuring method for solid state image pick-up devices and an apparatus suitable for the measuring.

BACKGROUND OF THE INVENTION

FIG. 1 illustrates a general constitution of solid state image pick-up devices which utilize the photo-electric converting function, the signal charge accumulating function, and the signal charge transmitting function of a CCD (charge coupled device). This is an example of an interline type CCD image pick-up device which is manufactured through semiconductor integrating technology and comprises: a plurality of photo-electric converting devices 11 for converting the incoming light rays to signal charges; a plurality of vertical transferring sections 12 for transferring the signal charges in the vertical direction; a transmitting gate 14 for transmitting the signal charges generated from the photo-electric converting devices 11 to the vertical transferring sections 12; and horizontal transferring sections 13 for outputting output signals by transferring in the horizontal direction the signal charges transmitted from the vertical transferring sections 12.

Here, the transmission of the signal charges is carried out by utilizing the fact that the CCD device forms low potential wells in the places where the voltage is applied. Thus the vertical transferring section 12 is provided with a plurality of vertical transferring electrodes 15, and the horizontal transferring section 13 is provided with a plurality of horizontal transferring electrodes 16, while vertical and horizontal driving signals $\phi V_1-\phi V_3$, $\phi H_1-\phi H_3$ with variable heights are supplied to them, so as for them to transmit the signal charges.

As the method of regenerating the images through a solid state image pick-up device, the usual scanning method is used, which is constituted such that horizontal transferring section 13 repeatedly outputs signals at a predetermined time intervals in such a manner that the picture elements belonging to the same row of the plural vertical transferring sections 12 are outputted by one row at a time, thereby forming the total image.

Thus, a driving pulse generating circuit is provided for controlling the vertical transferring sections 12 and the horizontal transferring sections 13 in order to transmit the signal charges and to output images in certain periods of intervals.

The light rays entering into such a solid state image pick-up device are converted into signal charges by the photo-electric converting device 11, and the converted signal charges are accommodated into potential wells W which are formed also by the photo-electric converting device 11. However, as shown in FIG. 2, if some strong light rays are inputted, and consequently, if the converted signal charges are beyond the charge accommodating capacity of the potential well W, then the excess charges C flow to potential well W' of the vertical transferring section or a nearby photo-electric converting device. Accordingly, in spite of the fact that no actual light rays from an actual object are inputted, the fallacious signals produce the socalled blooming phenomenon which is indicative of white stripes appearing around high luminance images.

Such a blooming phenomenon severely aggravates the picture quality and forms a definite defect in a solid state image pick-up device. In order to overcome this problem, many technical attempts such as the installation of an overflow drain have been made, but so far, no thorough solution has been produced. Accordingly, this blooming phenomenon has an important care-demanding item in designing a solid state image pick-up device.

The conventional measuring method for the blooming phenomenon is constituted such that a spot beam having a height equivalent to 1/10 of the height of the light receiving section of the solid state image pick-up device is irradiated, and the signal charges obtained therefrom are converted to image signals through a signal processing circuit, so that the pictures displayed through an image monitor or wave form monitor are visually observed as to the wave forms or the image quality, thereby recognizing the blooming characteristics.

However, in such a conventional blooming measuring method, during the conversion of the signal charges outputted from the solid state image pick-up device to image signals through a signal processing circuit, the signals are affected by the components of the signal processing circuit and other surrounding conditions, to such a degree that the characteristics of the signals are altered, thereby making it impossible to exactly and precisely measure the blooming characteristics, and also making it impossible to carry out a quantitative analysis.

SUMMARY OF THE INVENTION

The present invention is intended to overcome the disadvantages of the conventional methods.

Therefore, it is an object of the present invention to provide a blooming measuring method for solid state image pick-up devices, in which the produced bloomings can be directly and quantitatively measured.

It is another object of the present invention to provide a blooming measuring apparatus for solid state image pick-up devices, which is particularly suitable for carrying out the method of the present invention.

In achieving the above object, the blooming measuring method for solid state image pick-up devices according to the present invention is constituted such that a spot beam having a certain area is irradiated to the light receiving zone of the solid state image pick-up device; of the signal charges corresponding to one picture and outputted from the solid state image pick-up device, the number of "high" level signal charges are counted; and the counted value is compared with the area of the above mentioned spot beam.

The blooming measuring apparatus for solid state image pick-up devices, which is suitable for carrying out the method of the present invention, comprises:

a light ray supplying means for supplying a spot beam of a certain area to the solid state image pick-up device;

a driving signal generating means for driving the solid state image pick-up device;

a signal detecting means for detecting and outputting only signals corresponding to the signal charges among the output signals of the solid state image pick-up device in synchronization with the driving signal generating means; and a counting means for counting only the number of the "high" level signals among the output signals of the signal detecting means.

The output of the counting means is figure corresponding to the area or the number of the photoelectric converting device from which the charges are generated, and therefore, if this numeral figure can be compared with the area of the spot beam through an arithmetic means such as a central processing unit and the like, the degree of the produced blooming is to be quantitatively understood.

BRIEF DESCRIPTION OF THE DRAWINGS

The above objects and other advantages of the present invention will become more apparent by describing in detail the preferred embodiment of the present invention with reference to the attached drawings in which.

DESCRIPTION OF THE PREFERRED EMBODIMENT

Figure 3:
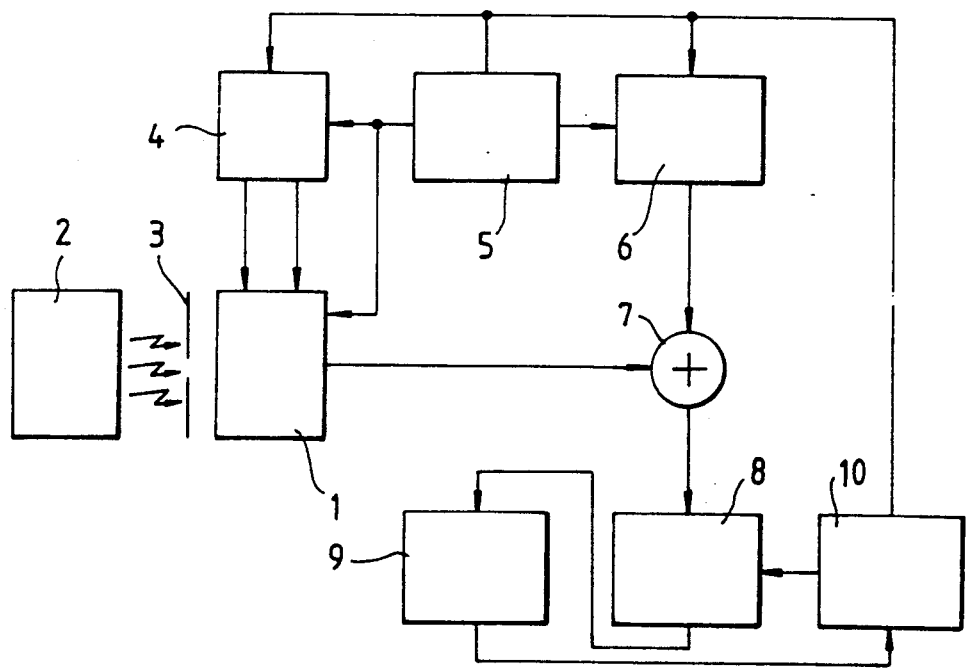
FIG. 3 is a block diagram showing the constitution of the blooming measuring device according to the present invention.

The blooming measuring apparatus for solid state image pick-up devices according to the present invention as shown in FIG. 3 comprises: a light source section 2 capable of adjusting the brightness thereof, and serving as a light ray supplying means for supplying spot beam of a certain area to the solid state image pick-up device 1; and a light limiting section 3 for delivering the light rays supplied from the light source section 2 to the solid state image pick-up device 1 in the form of a spot beam with a certain area.

Meanwhile, the solid state image pick-up device 1 receives vertical driving signals $\phi V$, horizontal driving signals $\phi H$ and reset signals $\phi R$ from a driving signal generating section 4, and outputs periodically the signal charges which are formed through the conversion of the incoming light rays.

The output signals of the solid image pick-up device 1 mixedly include the signals corresponding to the signal charges and the drive signals, for example, reset signal to drive the solid image pick-up device. And a signal detecting means functions to take only the signals corresponding to the signal charges from among the output signals of the solid state image pick-up device 1.

The method of removing the unnecessary signals from among the output signals of the solid state image pick-up device 1 is desirably constituted such that inverse potential signals having the same form as the unnecessary signals are added to the output signals. Thus, the signal detecting means desirably comprises: a synchronizing signal generating section 5 for outputting synchronizing signals synchronized with the driving signal generating section 4; an adding signal generating section 6 for outputting the above mentioned inverse potential signals having the same form as the unnecessary signals among the output signals of the solid state image pick-up device 1; and an adding section 7 for combining the output signals of the solid state image pick-up device 1 and the inverse potential signals of the adding signal generating section 6.

The output signals of the signal detecting means are supplied to a counting means, while the counting means desirably consists of a counting section 8 for counting periodically the high level signals from among the output signals of the signal detecting means, the countings being performed periodically at certain intervals, for example, at intervals corresponding to the time required for outputting the amount of signal charges of one picture from the solid state image pick-up device 1.

The output of the counting section 8 may be outputted through a proper indicator so that the measuring person could read them, but in the case where the output of the counting section 8 and the area of the spot beam supplied from the light ray supplying means are compared each other or repeatedly measured, a central processing section 9 for memorizing, calculating and for controlling the whole measuring device should be desirably provided. Further, although it is not illustrated, a proper displaying means such as a monitor and/or a printer may be desirably provided.

Meanwhile, in the case where a repeated measurement is carried out, a reset pulse generating section 10 may be desirably installed so that the whole measuring device can be initialized through the control of the central processing section 9 or by the measuring person.

Figure 4:
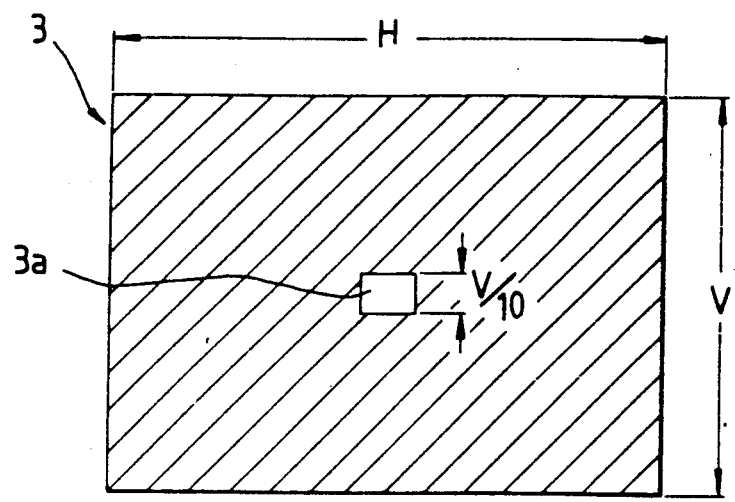
FIG. 4 is a plan view of a test pattern in a light limiting section for measuring the blooming characteristics of the solid state image pick-up device according to the present invention.
Figure 5:
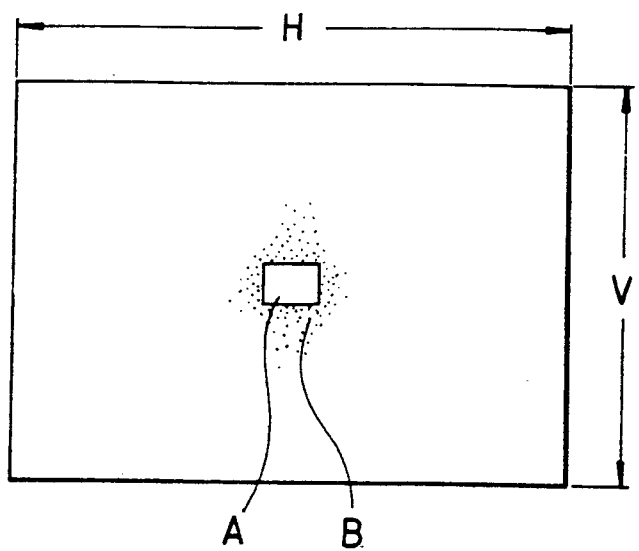
FIG. 5 is a plan view of a visual picture in the case where the test pattern of FIG. 4 is used.

In the blooming measuring apparatus according to the present invention, the light limiting section 3 used for the light ray supplying means may be desirably constituted in the form of the test pattern illustrated in FIG. 4, and this test pattern has width H and a height V which are same as the width and height of the light receiving area of the solid state image pick-up device, while a light passing aperture 3a having a height of V/10 is provided at the centre thereof. The method of forming the light passing aperture 3a may be constituted such that an opaque layer made of Cr and the like may be deposited on a thin glass board except on the portion where the light passing aperture 3a is to be formed, while the area of the light passing aperture 3a corresponds to the certain number of the photoelectric converting devices 11. Thus, the solid state image pick-up device 1 is shielded by means of such a test pattern, and if light rays of an intensity exceeding a certain intensity, i.e., exceeding the saturation intensity level of the solid state image pick-up device 1 are irradiated, then a visible image is formed as shown in FIG. 5. Here, the additional image formed around the picture A of the light passing aperture is the blooming portion B which has occurred due to the fallacious signals which are produced because of the fact that high intensity signal charges overflow from the light irradiating section, in spite of the fact that actual light rays are not irradiated to this portion.

Figure 6:
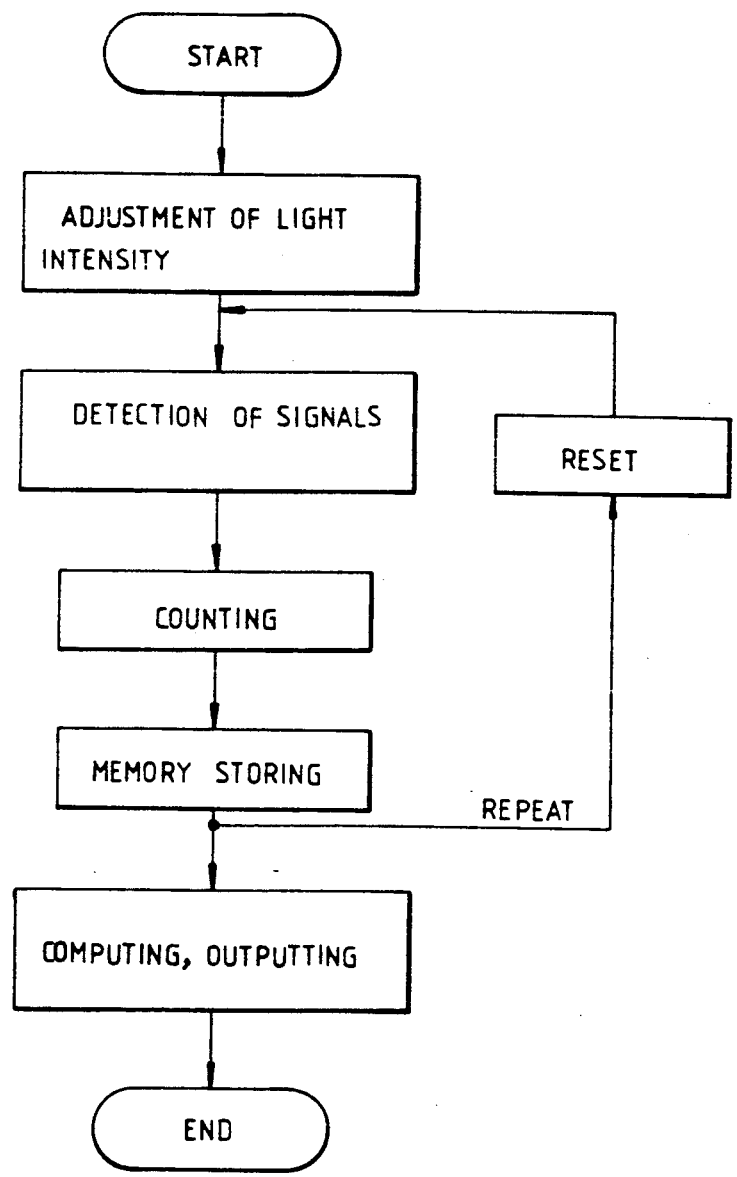
FIG. 6 is a flow chart showing the operation of the blooming measuring device illustrated in FIG. 5.
Figure 1:
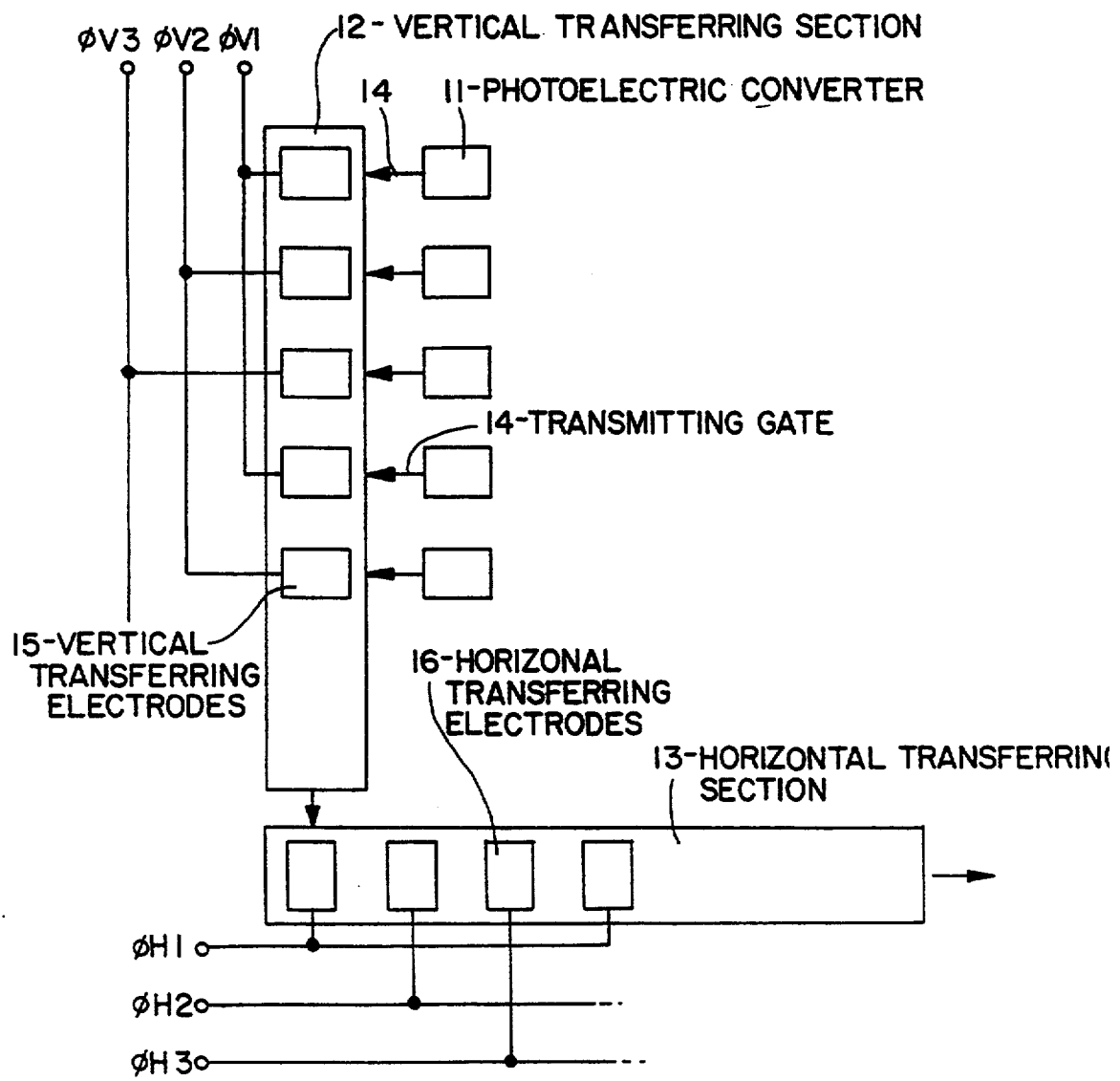
Figure 2:
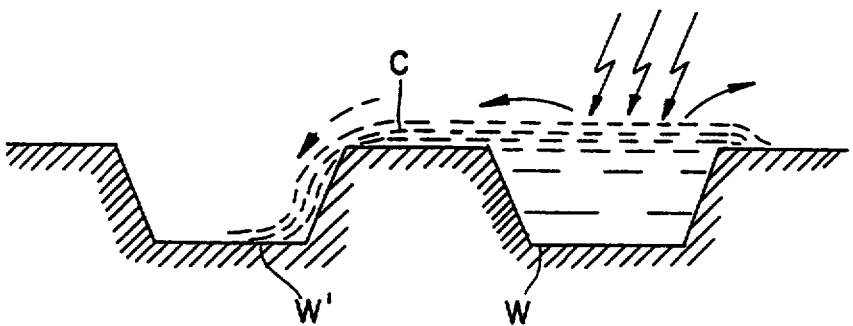
Figure 3:
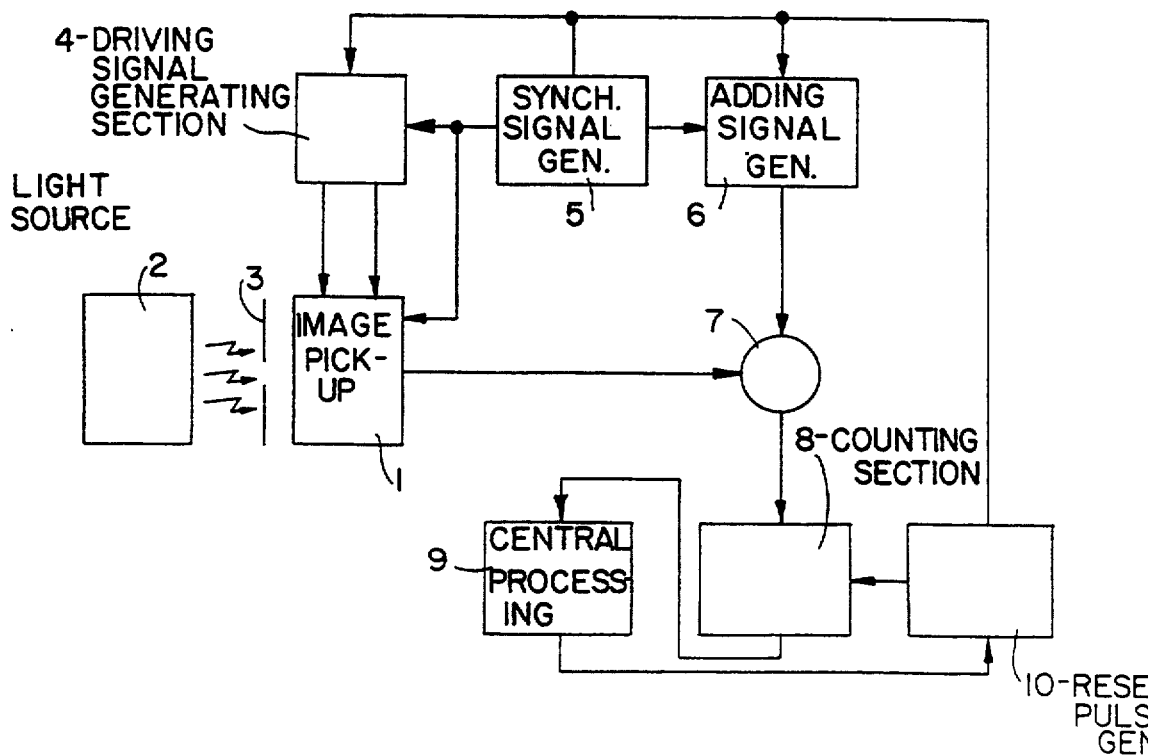

The blooming measuring apparatus according to the present invention constituted as above will now be described as to its operations referring to FIG. 6.

First, the test pattern having the light passing aperture 3a of the required size is mounted on the solid state image pick-up device 1, and light rays of a proper intensity are supplied by adjusting the light source section 2 (Light source brightness adjusting step).

Then, if the solid state image pick-up device is started to be driven upon generation of the driving signals from the driving signal generating section 4, the adding signal generating section 6 outputs inverse potential signals having the same form as the unnecessary signals among the output signals of the solid state image pick-up device 1, after being synchronized with the driving signal generating section 4 through the action of the synchronizing signal generating section 5. Then above mentioned output signals are supplied to the adding section 7 to be combined with the output signals of the solid state image pick-up device 1. Accordingly, the adding section 7 outputs only the signals corresponding to the signal charges of the solid state image pick-up device 1 (Signal detecting step).

Then, the counting section 8 counts the number of the high level signal from among the output signals of the adding section 7, and this counting is continued during the time when the solid state image pick-up device 1 are scanning one picture (counting step).

This counted value is stored into the central processing section 9 (memorizing step), the apparatus is reset (resetting step), and the above described operations are repeated several times.

During the repeating steps, the counted values produced st the different steps are memorized by the central processing section 9, and are subjected to arithmetical operations in the same section 9 in order to obtain typical values such as average values and the like, thereby adopting the values as the generated signal count value n2. This value is equivalent to the number of the photo-electric converting devices 11, which corresponds to the area of the blooming portion B plus the area of the light passing aperture 3a or the area A of its picture. Then it is compared with the memorized light supply count value n1 to be ultimately outputted in a proper form (Computing and outputting step).

Here, the light supply count value n1 is equivalent to the number of the photo-electric converting devices 11, which corresponds to the area of the light passing aperture 3a of the above described test pattern. In the case where this is to be counted through the use of the apparatus of the present invention, the apparatus of the present invention may be desirably operated in the manner described below.

First, the test pattern provided with the light passing aperture 3a of the required size is mounted on the solid state image pick-up device 1, and then, the light source section 2 is adjusted in such a manner that a low light intensity level which is not likely to produce the bloomings should be attained, e.g., that the light intensity level should become about 1/5 of the saturation light intensity level of the solid state image pick-up device 1. Then, if the apparatus of the present invention is operated under this condition, the counted value outputted from the counting section 8 becomes the light supply count value n1 corresponding to the area 3a of the light passing aperture 3a of test pattern. This is stored into the central processing section 9, and, after the light intensity of the light source section 2 is elevated to the blooming producing level, the above described measuring step is carried out.

Meanwhile, the light supply count value n1 and the generated signal count value n2 can be compared, computed and outputted in a variety of forms. For example, the ratio between the actual light supply portion and the generated amount of the signal charges can be computed using the formula, $$\left(\frac{n2}{n1} \times 100\right)\%.$$

while, the value of the generated amount of the blooming can be compared, computed and outputted using the formula $$\left(\frac{n2}{n1} - 1\right) \times 100\%.$$

The adoption of the blooming measuring method and apparatus according to the present invention brings the following advantages. That is, even without using an image displaying means, the blooming characteristics can be directly measured, and therefore, the variations of the characteristics due to the signal processing and conversions can be excluded, with the result that not only exact understandings of the characteristics become possible, but also the measured results are outputted in a quantitative form, thereby making it possible to precisely understand the characteristics. Thus, the present invention will contribute to upgrading the quality of the solid state image pick-up device.

What is claimed is:

1. A blooming measuring method for solid state image pick-up device, comprising:
   step of irradiating a spot beam having a certain area to the light receiving region of said solid state image pick-up device;
   step of counting the number of the "high" level signal charges among the signal charges which are outputted from said solid state image pick-up device, and which are equivalent to the amount of one picture; and
   step of comparing said counted value and said area of said spot beam.

2. A blooming measuring apparatus for solid state image pick-up device, comprising:
   a light supply means for supplying a spot beam having a required area to said solid state image pick-up device;
   a driving signal generating means for driving said solid state image pick-up device;
   a signal detecting means for detecting and outputting only the signals corresponding to the signal charges among the output signals of said solid state image pick-up device in synchronization with said driving signal generating means; and
   a counting means for counting the number of high level output signals among the output signals of said signal detecting means.

3. The blooming measuring apparatus for solid state image pick-up device as claimed in claim 2, wherein a central processing section is provided for comparing and computing the area of said spot beam and the counted values outputted from said counting means.

4. The blooming measuring apparatus for solid state image pick-up device as claimed in claim 2, wherein said signal detecting means consists of:
   a synchronizing signal generating section for outputting synchronizing signals in synchronization with said driving signal generating means;
   an adding signal generating section for outputting inverse potential signals in the same form as the unnecessary signals among the output signals of said solid state image pick-up device;

and an adding section for combining the output signals of said state image pick-up device and said inverse potential signals outputted from said adding signal generating section.

5. The blooming measuring apparatus for solid state image pick-up device as claimed in claim 2, wherein said light supply means consists of:
   a light source section capable of adjusting the light intensity;
   and a light limiting section provided with a light passing aperture having a required area.

* * * * *

UNITED STATES PATENT AND TRADEMARK OFFICE
CERTIFICATE OF CORRECTION

PATENT NO. : 5,157,501
DATED : October 20, 1992
INVENTOR(S) : No et al

Figure 1:
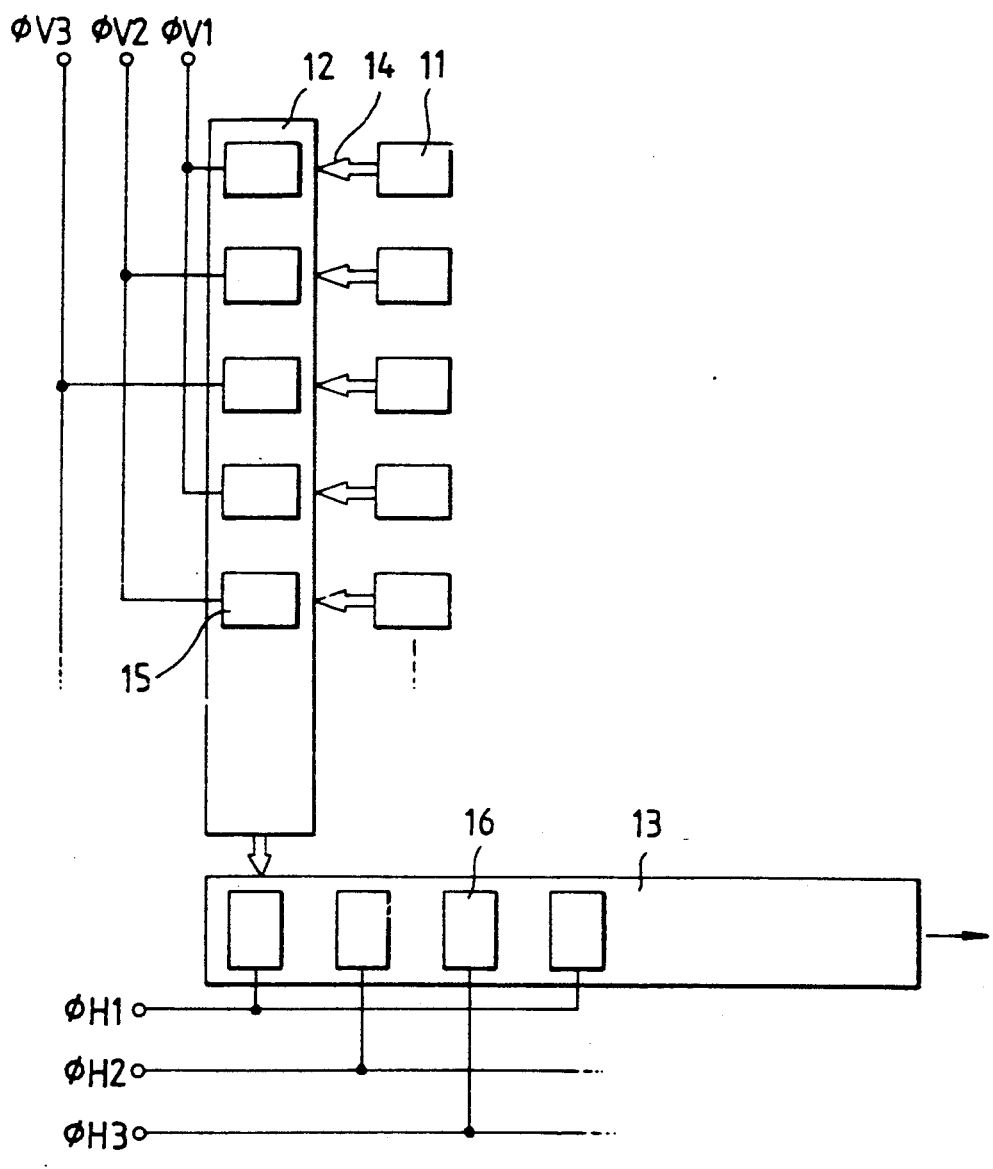
FIG. 1 is a schematical plan view of a usual solid state image pick-up device, and particularly an interline CCD image pick-up device.
Figure 2:
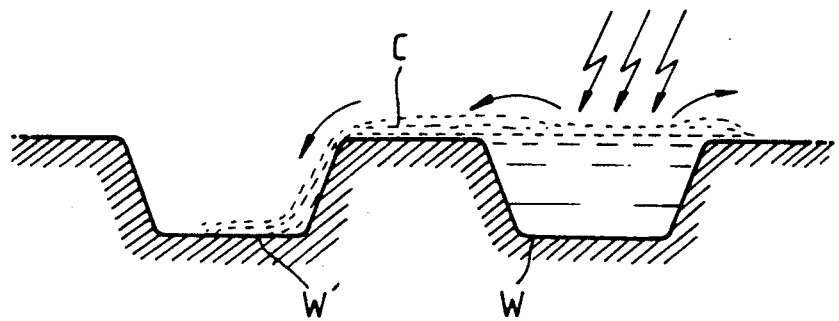
FIG. 2 is a schematical illustration showing the principle of the generation of the blooming phenomenon.

It is certified that error appears in the above-indentified patent and that said Letters Patent is hereby corrected as shown below:

Delete Figures 1-3, and substitute therefor the Drawing Sheet, consisting of Figs.1-3, as shown on the attached pages.

Signed and Sealed this

First Day of October, 1996

Attest:

BRUCE LEHMAN

Attesting Officer

Commissioner of Patents and Trademarks